United States Patent
Tamura et al.

(10) Patent No.: US 9,546,298 B2
(45) Date of Patent: Jan. 17, 2017

(54) REACTIVE FLUORINE-CONTAINING HIGHLY BRANCHED POLYMER AND CURABLE COMPOSITION CONTAINING THE SAME

(71) Applicant: NISSAN CHEMICAL INDUSTRIES, LTD., Tokyo (JP)

(72) Inventors: Hiroyasu Tamura, Funabashi (JP); Masayuki Haraguchi, Funabashi (JP); Masaaki Ozawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/360,464

(22) PCT Filed: Nov. 26, 2012

(86) PCT No.: PCT/JP2012/080512
§ 371 (c)(1),
(2) Date: May 23, 2014

(87) PCT Pub. No.: WO2013/077451
PCT Pub. Date: May 30, 2013

(65) Prior Publication Data
US 2014/0308503 A1    Oct. 16, 2014

(30) Foreign Application Priority Data
Nov. 25, 2011    (JP) ................................. 2011-257704

(51) Int. Cl.
C09D 133/16    (2006.01)
C08F 220/24    (2006.01)
(Continued)

(52) U.S. Cl.
CPC .......... *C09D 133/16* (2013.01); *C08F 220/24* (2013.01); *C08G 18/4063* (2013.01); *C08G 18/44* (2013.01);
(Continued)

(58) Field of Classification Search
USPC ................................. 428/220, 334; 526/245
See application file for complete search history.

(56) References Cited

U.S. PATENT DOCUMENTS

2010/0093919 A1*   4/2010   Uesugi .................. D06M 15/27
                                                                      524/544
2012/0135206 A1*   5/2012   Haraguchi ................ C08F 2/48
                                                                       428/195.1
(Continued)

FOREIGN PATENT DOCUMENTS

| JP | A-2007-70551 |   | 3/2007 |
| JP | 2009-149824 | * | 7/2009 |

(Continued)

OTHER PUBLICATIONS

International Search Report issued in International Patent Application No. PCT/JP2012/080512 dated Dec. 25, 2012.
(Continued)

*Primary Examiner* — Peter D Mulcahy
*Assistant Examiner* — Henry Hu
(74) *Attorney, Agent, or Firm* — Oliff PLC

(57) ABSTRACT

A material for a surface modifying agent with which the problems of insufficient durability as abrasion and chemical resistances of surface modification effect in polyurethane surface modification by the prior surface modifying agent are resolved, and is immobilized in a matrix resin firmly and improved in durability. A reactive fluorine-containing highly branched polymer obtained by: polymerizing monomer A having in a molecule two or more radically polymerizable
(Continued)

double bonds, monomer B having in a molecule a fluoroalkyl group and at least one radically polymerizable double bond, and monomer C having in a molecule an alcoholic hydroxy group and minimum, one radically polymerizable double bond, in presence of a polymerization initiator D in an amount of 5 % to 200 % by mole with respect to the number of moles of the monomer A; a curable composition containing the reactive fluorine-containing highly branched polymer; and a cured film obtained from the composition.

15 Claims, 4 Drawing Sheets

(51) Int. Cl.
| | | |
|---|---|---|
| C08J 5/18 | (2006.01) | |
| C09D 201/00 | (2006.01) | |
| C08G 18/62 | (2006.01) | |
| C08G 18/79 | (2006.01) | |
| C09D 175/06 | (2006.01) | |
| C08G 18/40 | (2006.01) | |
| C08G 18/44 | (2006.01) | |

(52) U.S. Cl.
CPC ......... *C08G 18/6229* (2013.01); *C08G 18/792* (2013.01); *C08J 5/18* (2013.01); *C09D 175/06* (2013.01); *C09D 201/005* (2013.01); *Y10T 428/263* (2015.01); *Y10T 428/3154* (2015.04)

(56) References Cited

U.S. PATENT DOCUMENTS

2013/0302598 A1* 11/2013 Haraguchi ............... C09D 4/06
428/336
2015/0158959 A1* 6/2015 Misaki ................. C09D 163/00
523/433

FOREIGN PATENT DOCUMENTS

| | | |
|---|---|---|
| JP | 2009-149824 A * | 7/2009 |
| JP | A-2009-149824 | 7/2009 |
| WO | WO-2008/093567 A1 * | 8/2008 |
| WO | WO 2008/093567 A1 | 8/2008 |
| WO | WO-2010/137724 A1 * | 12/2010 |
| WO | WO 2010/137724 A1 | 12/2010 |
| WO | WO 2012/133622 A1 | 10/2012 |

OTHER PUBLICATIONS

Written Opinion issued in International Patent Application No. PCT/JP2012/080512 dated Dec. 25, 2012.

* cited by examiner

REACTIVE FLUORINE-CONTAINING HIGHLY BRANCHED POLYMER AND CURABLE COMPOSITION CONTAINING THE SAME

TECHNICAL FIELD

The present invention relates to a reactive fluorine-containing highly branched polymer, a curable composition containing the polymer, and a cured film obtained from the curable composition.

BACKGROUND ART

Polymer materials have been recently used in various fields, and accordingly, characteristics of their surfaces and interfaces have been important as well as their polymer characteristics as a matrix in accordance with the fields. For example, it has been expected that using a fluorine-based compound having low surface energy as a surface modifying agent improves characteristics about interface control such as water repellency and oil repellency, antifoulingness, mold releasability, nonadhesiveness, abrasion resistance, releasability, slidability, anti-reflection characteristics, and chemical resistance, and various technologies have been proposed.

Polyurethane as a thermosetting resin, which is a polymer obtained through a thermosetting process between an isocyanate group-containing compound and a compound having active hydrogen such as a polyol, has been used in a variety of fields in such various forms as flexible foam, rigid foam, elastomer, adhesive, coating, and binder, because various characteristics can be brought out through the combination of the compounds.

As an example of surface modification of the polyurethane resin, there is known surface modification of polyurethane resin by a fluorine-containing highly branched polymer with a fluoroalkyl group incorporated (Patent Document 1).

PRIOR ART DOCUMENT

Patent Document

Patent Document 1: WO 2010/137724

SUMMARY OF THE INVENTION

Problem to be Solved by the Invention

However, because the surface modifying agent disclosed in Patent Document 1 does not have any reaction site with a matrix resin (polyurethane), the agent is difficult to be immobilized in the matrix resin. For this reason, polyurethane surface modification by the surface modifying agent may result in insufficient durability such as abrasion resistance and chemical resistance of a surface modification effect, and hence a surface modifying agent that is immobilized in a matrix resin more firmly is required.

Means for Solving the Problem

As a result of earnest study for achieving the above object, the inventors of the present invention have found out that by adopting a fluorine-containing highly branched polymer having reactivity with a polyurethane composition, which has not conventionally been studied, as a surface modifying agent, when a polyurethane resin is cross-linked and cured, the fluorine-containing highly branched polymer as the surface modifying agent is simultaneously incorporated into the cross-linked structure to be firmly immobilized and have achieved the present invention.

The present invention relates to, as a first aspect, a reactive fluorine-containing highly branched polymer obtained by: polymerizing a monomer A having in a molecule two or more radically polymerizable double bonds, a monomer B having in a molecule a fluoroalkyl group and at least one radically polymerizable double bond, and a monomer C having in a molecule an alcoholic hydroxy group and at least one radically polymerizable double bond, in a presence of a polymerization initiator D in an amount of 5% to 200% by mole with respect to the number of moles of the monomer A.

The present invention relates to, as a second aspect, the reactive fluorine-containing highly branched polymer according to the first aspect, obtained using the monomer C in an amount of 5% to 300% by mole with respect to the number of moles of the monomer A.

The present invention relates to, as a third aspect, the reactive fluorine-containing highly branched polymer according to the second aspect, in which the monomer C is a compound having at least either a vinyl group or a (meth)acryl group.

The present invention relates to, as a fourth aspect, the reactive fluorine-containing highly branched polymer according to the third aspect, in which the monomer C is a compound of Formula [1]:

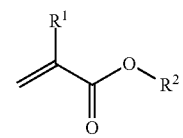

(where $R^1$ is a hydrogen atom or a methyl group; and $R^2$ is a $C_{1-30}$ aliphatic group substituted with at least one hydroxy group).

The present invention relates to, as a fifth aspect, the reactive fluorine-containing highly branched polymer according to the fourth aspect, in which $R^2$ is a $C_{1-30}$ aliphatic group in which a hydroxy group is bound to a primary carbon atom in Formula [1].

The present invention relates to, as a sixth aspect, the reactive fluorine-containing highly branched polymer according to the fifth aspect, in which the monomer C is 4-hydroxybutyl(meth)acrylate.

The present invention relates to, as a seventh aspect, the reactive fluorine-containing highly branched polymer according to the first aspect, obtained by using the monomer B in an amount of 5% to 300% by mole with respect to the number of moles of the monomer A.

The present invention relates to, as an eighth aspect, the reactive fluorine-containing highly branched polymer according to the seventh aspect, in which the monomer B is a compound having at least either a vinyl group or a (meth)acryl group.

The present invention relates to, as a ninth aspect, the reactive fluorine-containing highly branched polymer according to the eighth aspect, in which the monomer B is a compound of Formula [2]:

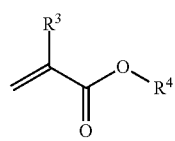

(where $R^3$ is a hydrogen atom or a methyl group; and $R^4$ is a $C_{2-12}$ fluoroalkyl group optionally substituted with a hydroxy group).

The present invention relates to, as a tenth aspect, the reactive fluorine-containing highly branched polymer according to the ninth aspect, in which the monomer B is a compound of Formula [3]:

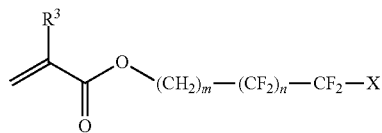

(where $R^3$ is the same meaning as the definition in Formula [2]; X is a hydrogen atom or a fluorine atom; m is 1 or 2; and n is an integer of 0 to 5).

The present invention relates to, as an eleventh aspect, the reactive fluorine-containing highly branched polymer according to the first aspect, in which the monomer A is a compound having either a vinyl group or a (meth)acryl group or both a vinyl group and a (meth)acryl group.

The present invention relates to, as a twelfth aspect, the reactive fluorine-containing highly branched polymer according to the eleventh aspect, in which the monomer A is a divinyl compound or a di(meth)acrylate compound.

The present invention relates to, as a thirteenth aspect, the reactive fluorine-containing highly branched polymer according to the twelfth aspect, in which the monomer A is divinylbenzene or ethylene glycol di(meth)acrylate.

The present invention relates to, as a fourteenth aspect, the reactive fluorine-containing highly branched polymer according to any one of the first to thirteenth aspects, in which the polymerization initiator D is an azo-based polymerization initiator.

The present invention relates to, as a fifteenth aspect, the reactive fluorine-containing highly branched polymer according to the fourteenth aspect, in which the polymerization initiator D is dimethyl 2,2'-azobisisobutyrate or 2,2'-azobis(2-methylbutyronitrile).

The present invention relates to, as a sixteenth aspect, a varnish comprising: the reactive fluorine-containing highly branched polymer as described in any one of the first to fifteenth aspects.

The present invention relates to, as a seventeenth aspect, a thin film formed of the reactive fluorine-containing highly branched polymer as described in any one of the first to fifteenth aspects.

The present invention relates to, as an eighteenth aspect, a curable composition comprising: (a) the reactive fluorine-containing highly branched polymer as described in the first to fifteenth aspects; (b) a curing agent; and (c) a polyol compound.

The present invention relates to, as a nineteenth aspect, the curable composition according to the eighteenth aspect, in which a content of (a) the reactive fluorine-containing highly branched polymer is 0.01 to 20 parts by mass with respect to 100 parts by mass of a total of (b) the curing agent and (c) the polyol compound.

The present invention relates to, as a twentieth aspect, the curable composition according to the eighteenth aspect or the nineteenth aspect, in which (b) the curing agent is (b1) a multifunctional isocyanate compound.

The present invention relates to, as a twenty-first aspect, the curable composition according to the eighteenth aspect or the nineteenth aspect, in which (b) the curing agent is (b2) an amino compound.

The present invention relates to, as a twenty-second aspect, the curable composition according to any one of the eighteenth to twenty-first aspects, further comprising: (d) a reactive silicone compound.

The present invention relates to, as a twenty-third aspect, the curable composition according to any one of the eighteenth to twenty-second aspects, further comprising: (e) a solvent.

The present invention relates to, as a twenty-fourth aspect, a cured film obtained from the curable composition as described in any one of the eighteenth to twenty-third aspects.

The present invention relates to, as a twenty-fifth aspect, the cured film according to the twenty-fourth aspect, having a film thickness of 0.1 μm to 100 μm.

The present invention relates to, as a twenty-sixth aspect, a surface-modified film formed by: applying the curable composition as described in the twenty-third aspect onto part or the whole of a substrate surface to form a coated film: drying the coated film to remove a solvent: and giving an increased temperature to the coated film to cure the coated film.

The present invention relates to, as a twenty-seventh aspect, the surface-modified film according to the twenty-sixth aspect, having a film thickness of 0.1 μm to 100 μm.

Effects of the Invention

In the reactive fluorine-containing highly branched polymer according to the present invention, a branched structure is actively introduced. Thus, the polymer has less intermolecular entanglement than linear polymers, shows a fine particle-like behavior, and has higher solubility to organic solvents and higher dispersibility to resins. Because of this, when the reactive fluorine-containing highly branched polymer according to the present invention is added to a curable composition or the like to form a cured film, the fine particle-shaped highly branched polymer easily moves to an interface (the surface of the cured film), leading to improved modification of a resin surface.

In particular, the reactive fluorine-containing highly branched polymer according to the present invention incorporates an alcoholic hydroxy group having reactivity with polyurethane into its polymer side chain, thereby, when the reactive fluorine-containing highly branched polymer is added to a polyurethane composition to form a resin molded product, an urethane bond is formed between an isocyanate group and the fluorine-containing highly branched polymer when polyurethane is cured and incorporating the highly branched polymer into a cross-linked structure. This gives a polyurethane cured product having high durability such as abrasion resistance and chemical resistance of the surface modification effect. When the reactive fluorine-containing highly branched polymer is added to a polyester curable composition to form a resin molded product, a cross-liking reaction proceeds between a curing agent and the highly branched polymer during curing, thereby incorporating the highly branched polymer into a cross-linked structure. This gives a polyester cured product having high durability such as abrasion resistance and chemical resistance of the surface modification effect.

MODES FOR CARRYING OUT THE INVENTION

<Reactive Fluorine-Containing Highly Branched Polymer>

Figure 1:
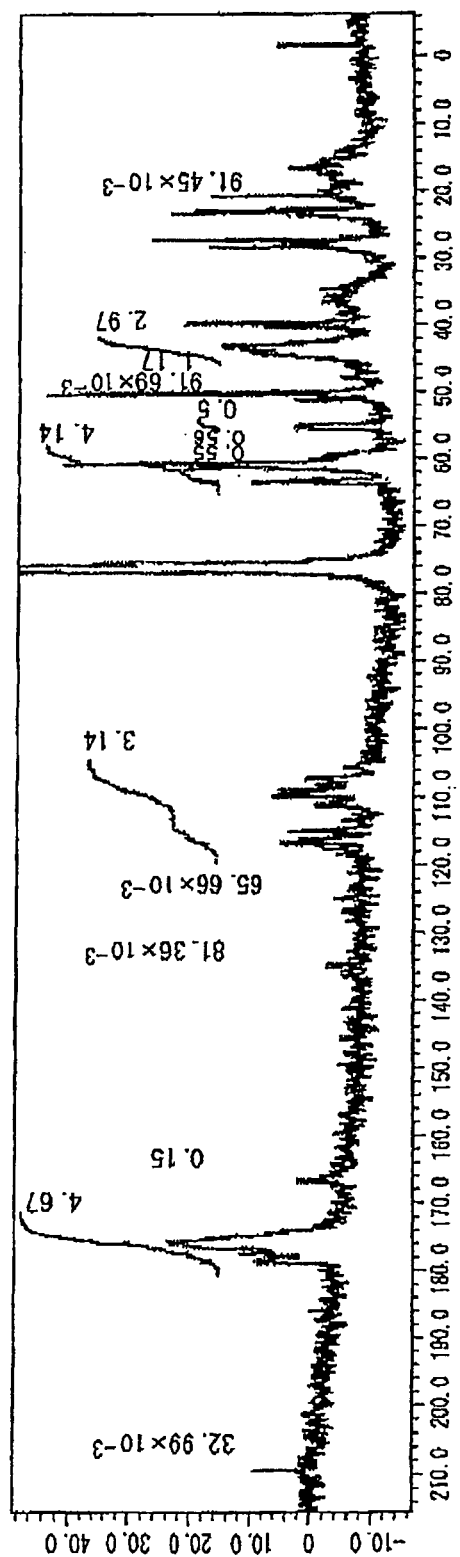
FIG. 1 is a graph illustrating a $^{13}$C NMR spectrum of a highly branched polymer 1 obtained in Example 1.

The reactive fluorine-containing highly branched polymer according to the present invention is a fluorine-containing highly branched polymer obtained by polymerizing a monomer A having in the molecule two or more radically polymerizable double bonds, a monomer B having in the molecule a fluoroalkyl group and at least one radically polymerizable double bond, and a monomer C having in the molecule an alcoholic hydroxy group and at least one radically polymerizable double bond in the presence of a polymerization initiator D in an amount of 5% to 200% by mole with respect to the number of moles of the monomer A. The reactive fluorine-containing highly branched polymer according to the present invention is what is called a fluorine-containing highly branched polymer of the initiator-fragment incorporation radical polymerization (IFIRP) type and has at its terminal a fragment of the polymerization initiator D used in polymerization.

[Monomer A]

In the present invention, the monomer A having in the molecule two or more radically polymerizable double bonds preferably has either or both a vinyl group or/and a (meth) acryl group and is more preferably a divinyl compound or a di(meth)acrylate compound. In the present invention, the (meth)acrylate compound refers to both an acrylate compound and a methacrylate compound. For example, (meth) acrylic acid refers to acrylic acid and methacrylic acid.

Examples of the monomer A include organic compounds of (A1) to (A7) below.

(A1) Vinyl hydrocarbons:
(A 1-1) Aliphatic vinyl hydrocarbons; isoprene, butadiene, 3-methyl-1,2-butadiene, 2,3-dimethyl-1,3-butadiene, 1,2-polybutadiene, pentadiene, hexadiene, and octadiene
(A1-2) Alicyclic vinyl hydrocarbons; cyclopentadiene, cyclohexadiene, cyclooctadiene, and norbornadiene
(A1-3) Aromatic vinyl hydrocarbons; divinylbenzene, divinyltoluene, divinylxylene, trivinylbenzene, divinylbiphenyl, divinylnaphthalene, divinylfluorene, divinylcarbazole, and divinylpyridine
(A2) Vinyl esters, allyl esters, vinyl ethers, allyl ethers, and vinyl ketones:
(A2-1) Vinyl esters; divinyl adipate, divinyl maleate, divinyl phthalate, divinyl isophthalate, divinyl itaconate, and vinyl(meth)acrylate:
(A2-2) Allyl esters; diallyl maleate, diallyl phthalate, diallyl isophthalate, diallyl adipate, and allyl(meth)acrylate
(A2-3) Vinyl ethers; divinyl ether, diethylene glycol divinyl ether, and triethylene glycol divinyl ether
(A2-4) Allyl ethers; diallyl ether, diallyloxyethane, trially-loxyethane, tetraallyloxyethane, tetraallyloxypropane, tetraallyloxybutane, and tetramethallyloxyethane
(A2-5) Vinyl ketones; divinyl ketone and diallyl ketone
(A3) (Meth)acrylic esters:
ethylene glycol di(meth)acrylate, triethylene glycol di(meth) acrylate, propylene glycol di(meth)acrylate, neopentyl glycol di(meth)acrylate, trimethylolpropane tri(meth) acrylate, ditrimethylolpropane tetra(meth)acrylate, glycerol tri(meth)acrylate, pentaerythritol tetra(meth)acrylate, alkoxy titanium tri(meth)acrylate, 1,6-hexanediol di(meth)acrylate, 2-methyl-1,8-octanediol di(meth)acrylate, 1,9-nonanediol di(meth)acrylate, 1,10-decanediol di(meth)acrylate, tricyclo[5.2.1.0$^{2,6}$]decanedimethanol di(meth)acrylate, dioxane glycol di(meth)acrylate, 2-hydroxy-1-acryloyloxy-3-methacryloyloxypropane, 2-hydroxy-1, 3-di(meth)acryloyloxypropane, 9,9-bis[4-(2-(meth) acryloyloxyethoxy)phenyl]fluorene, undecylenoxy ethylene glycol di(meth)acrylate, bis[4-(meth)acryloylthiophenyl]sulfide, bis[2-(meth)acryloylthioethyl]sulfide, 1,3-adamantanediol di(meth)acrylate, and 1,3-adamantane dimethanol di(meth)acrylate
(A4) Vinyl compounds having a polyalkylene glycol chain:
polyethylene glycol (molecular weight 300) di(meth)acrylate and polypropylene glycol (molecular weight 500) di(meth)acrylate
(A5) Nitrogen-containing vinyl compounds:
diallylamine, diallyl isocyanurate, diallyl cyanurate, methylenebis(meth)acrylamide, and bismaleimide
(A6) Silicon-containing vinyl compounds: dimethyldivinylsilane, divinyl(methyl)(phenyl)silane, diphenyldivinylsilane, 1,3-divinyl-1,1,3,3-tetramethyldisilazane, 1,3-divinyl-1,1,3,3-tetraphenyldisilazane, and diethoxyvinylsilane
(A7) Fluorine-containing vinyl compounds:
1,4-divinylperfluorobutane, 1,4-divinyloctafluorobutane, 1.6-divinylperfluorohexane, 1,6-divinyldodecafluorohexane, 1,8-divinylperfluorooctane, and 1,8-divinylhexadecafluorooctane Among these, preferable are aromatic vinyl hydrocarbons of the (A1-3) group, vinyl esters, allyl esters, vinyl ethers, allyl ethers, and vinyl ketones of the (A2) group, (meth) acrylic esters of the (A3) group, vinyl compounds having a polyalkylene glycol chain of the (A4) group, and nitrogen-containing vinyl compounds of the (A5) group. Particularly preferable are divi Zone Name: OCRZone nylbenzene belonging to the (A1-3) group; diallyl phthalate belonging to the (A2) group; ethylene glycol di(meth)acrylate, 1,3-adamantane dimethanol di(meth)acrylate, and tricyclo[5.2.1.0$^{2,}$ $_6$]decanedimethanol di(meth)acrylate belonging to the (A3) group; and methylenebis(meth)acrylamide belonging to the (A5) group. Among these, divinylbenzene and ethylene glycol di(meth)acrylate are particularly preferable.

[Monomer B]

In the present invention, the monomer B having in the molecule a fluoroalkyl group and at least one radically polymerizable double bond preferably has at least either a vinyl group or a (meth)acryl group, is preferably the compound of Formula [2], and is more preferably the compound of Formula [3].

Examples of the monomer B include 2,2,2-trifluoroethyl (meth)acrylate, 2,2,3,3,3-pentafluoropropyl(meth)acrylate, 2-(perfluorobutyl)ethyl (meth)acrylate, 2-(perfluorohexyl)

ethyl (meth)acrylate, 2-(perfluorooctyl)ethyl (meth)acrylate, 2-(perfluorodecyl)ethyl (meth)acrylate, 2-(perfluoro-3-methylbutyl)ethyl (meth)acrylate, 2-(perfluoro-5-methylhexyl)ethyl (meth)acrylate, 2-(perfluoro-7-methyloctyl) ethyl (meth)acrylate, 1H,1H,3H-tetrafluoropropyl(meth) acrylate, 1H,1H,5H-octafluoropentyl(meth)acrylate, 1H,1H,7H-dodecafluoroheptyl(meth)acrylate, 1H,1H,9H-hexadecafluorononyl(meth)acrylate, 1H-1-(trifluoromethyl) trifluoroethyl(meth)acrylate, 1H,1H,3H-hexafluorobutyl (meth)acrylate, 3-perfluorobutyl-2-hydroxypropyl(meth) acrylate, 3-perfluorohexyl-2-hydroxypropyl(meth)acrylate, 3-perfluorooctyl-2-hydroxypropyl(meth)acrylate, 3-(perfluoro-3-methylbutyl)-2-hydroxypropyl(meth)acrylate, 3-(perfluoro-5-methylhexyl)-2-hydroxypropyl(meth)acrylate, and 3-(perfluoro-7-methyloctyl)-2-hydroxypropyl (meth)acrylate.

In the present invention, in view of reactivity and a surface modification effect, the amount used of the monomer B is 5% to 300% by mole, particularly 10% to 150% by mole, and more preferably 20% to 100% by mole with respect to the number of moles used of the monomer A.

[Monomer C]

In the present invention, the monomer C having in the molecule an alcoholic hydroxy group and at least one radically polymerizable double bond preferably has at least either a vinyl group or a (meth)acryl group and is particularly preferably the compound of Formula [1]. In the present invention, the alcoholic hydroxy group indicates a hydroxy group in which the atom to which the hydroxy group is bound does not constitute any aromatic ring. In other words, the hydroxy group does not include a hydroxy group that is directly bound to an aromatic ring, that is, a phenolic hydroxy group.

In Formula [1], $R^2$ is a $C_{1-30}$ aliphatic group substituted with at least one hydroxy group. The $C_{1-30}$ aliphatic group may be any of a linear-chain aliphatic group, a branched aliphatic group, and a cyclic aliphatic group. The group may contain a hetero atom such as a nitrogen atom, an oxygen atom, and a sulfur atom.

The hydroxy group bound to the aliphatic group may be any of a primary hydroxy group (bound to a primary carbon atom), a secondary hydroxy group (bound to a secondary carbon atom), and a tertiary hydroxy group (bound to a tertiary carbon atom). In view of the reactivity of the hydroxy group, the primary hydroxy group is most preferable, the secondary hydroxy group is the next, followed by the tertiary hydroxy group. The hydroxy group may be monosubstituted or polysubstituted in the aliphatic group.

Among these, it is preferable in Formula [1] that $R^2$ is a $C_{1-30}$ aliphatic group in which the hydroxy group is bound to the primary carbon atom, in other words, that $R^2$ is a group having the hydroxy group at the terminal of the aliphatic group.

Examples of the monomer C include (meth)acrylates containing a hydroxy group such as 2-hydroxyethyl (meth) acrylate, 2,2-dihydroxyethyl (meth)acrylate, 2-hydroxypropyl(meth)acrylate, 3-hydroxypropyl(meth)acrylate, 2,3-dihydroxypropyl(meth)acrylate, 4-hydroxybutyl(meth) acrylate, 4-(hydroxymethyl)cyclohexylmethyl(meth) acrylate, diethylene glycol mono(meth)acrylate, tetraethylene glycol mono(meth)acrylate, pentaethylene glycol mono(meth)acrylate, decaethylene glycol mono(meth) acrylate, polyethylene glycol mono(meth)acrylate, propylene glycol mono(meth)acrylate, dipropylene glycol mono (meth)acrylate, polypropylene glycol mono(meth)acrylate, tetramethylene glycol mono(meth)acrylate, ditetramethylene glycol mono(meth)acrylate, and polytetramethylene glycol mono(meth)acrylate; and (meth)acrylamides containing a hydroxy group such as 2-hydroxyethyl (meth)acrylamide. Among these, 4-hydroxybutyl(meth)acrylate is preferable.

In the present invention, in view of the reactivity with a curing agent when contained in a curable composition described below, the amount used of the monomer C is 5% to 300% by mole, particularly 10% to 150% by mole, and more preferably 20% to 100% by mole with respect to the number of moles used of the monomer A.

[Polymerization Initiator D]

The polymerization initiator D in the present invention is preferably an azo-based polymerization initiator. Examples of the azo-based polymerization initiator include compounds of (1) to (5) below.

(1) Azo nitrile compounds:
2,2'-azobisisobutyronitrile, 2,2'-azobis(2-methylbutyronitrile), 2,2'-azobis(2,4-dimethylvaleronitrile), 1,1'-azobis (1-cyclohexanecarbonitrile), 2,2'-azobis(4-methoxy-2,4-dimethylvaleronitrile), and 2-(carbamoylazo) isobutyronitrile (2) Azo amide compounds:
2,2'-azobis{2-methyl-N-[1,1-bis(hydroxymethyl)-2-hydroxyethyl]propionamide}, 2,2'-azobis{2-methyl-N-[2-(1-hydroxybutyl)]propionamide}, 2,2'-azobis[2-methyl-N-(2-hydroxyethyl)propionamide], 2,2'-azobis[N-(2-propenyl)-2-methylpropionamide], 2,2'-azobis(N-butyl-2-methylpropionamide), and 2,2'-azobis(N-cyclohexyl-2-methylpropionamide)

(3) Cyclic azo amidine compounds:
2,2'-azobis[2-(2-imidazolin-2-yl)propane]dihydrochloride, 2,2'-azobis[2-(2-imidazolin-2-yl)propane]disulfate dihydrate, 2,2'-azobis[2-[1-(2-hydroxyethyl)-2-imidazolin-2-yl]propane]dihydrochloride, 2,2'-azobis[2-(2-imidazolin-2-yl)propane], and 2,2'-azobis(1-imino-1-pyrrolidino-2-methylpropane)dihydrochloride (4) Azo amidine compounds:
2,2'-azobis(2-methylpropionamidine)dihydrochloride and 2,2'-azobis[N-(2-carboxyethyl)-2-methylpropionamidine]tetrahydrate (5) Others:
dimethyl 2,2'-azobisisobutyrate, 2,2'-azobis(2,4,4-trimethylpentane), 1,1'-azobis(1-acetoxy-1-phenylethane), dimethyl 1,1'-azobis(1-cyclohexanecarboxylate), 4,4'-azobis (4-cyanopentanoic acid), 4,4'-azobis(2-(perfluoromethyl) ethyl 4-cyanopentanoate), 4,4'-azobis(2-(perfluorobutyl) ethyl 4-cyanopentanoate), and 4,4'-azobis(2-(perfluorohexyl)ethyl 4-cyanopentanoate)

Among the above azo-based polymerization initiators, in view of surface modification, 2,2'-azobis(2-methylbutyronitrile) and dimethyl 2,2'-azobisisobutyrate are preferable.

The polymerization initiator D is used in an amount of 5% to 200% by mole, preferably 20% to 200% by mole, and more preferably 20% to 100% by mole with respect to the number of moles of the monomer A.

<Method for Manufacturing Reactive Fluorine-Containing Highly Branched Polymer>

The reactive fluorine-containing highly branched polymer according to the present invention is obtained by polymerizing the monomer A, the monomer B, and the monomer C in the presence of the polymerization initiator D in a predetermined amount with respect to the monomer A.

Examples of the method for polymerizing the monomer A, the monomer B, and the monomer C in the presence of the polymerization initiator D include known methods such as solution polymerization, dispersion polymerization, precipitation polymerization, and bulk polymerization, and among these, solution polymerization and precipitation polymerization are preferable. In view of molecular weight control in particular, it is preferable to perform a reaction through solution polymerization in an organic solvent.

Examples of the organic solvent used in the polymerization include aromatic hydrocarbons such as benzene, toluene, xylene, ethyl benzene, and tetralin; aliphatic or alicyclic hydrocarbons such as n-hexane, n-heptane, mineral spirit, and cyclohexane; halogenides such as methyl chloride, methyl bromide, methyl iodide, methylene dichloride, chloroform, carbon tetrachloride, trichloroethylene, perchloroethylene, and orthodichlorobenzene; esters or ester ethers such as ethyl acetate, butyl acetate, methoxybutyl acetate, methylcellosolve acetate, ethylcellosolve acetate, and propylene glycol monomethyl ether acetate; ethers such as diethyl ether, tetrahydrofuran, 1,4-dioxane, methylcellosolve, ethylcellosolve, butylcellosolve, and propylene glycol monomethyl ether; ketones such as acetone, ethyl methyl ketone, isobutyl methyl ketone, di-n-butyl ketone, and cyclohexanone; alcohols such as methanol, ethanol, n-propanol, isopropanol, n-butanol, isobutanol, tert-butanol, 2-ethylhexyl alcohol, benzyl alcohol, and ethylene glycol; amides such as N,N-dimethylformamide, N,N-dimethylacetamide, and N-methyl-2-pyrrolidone; sulfoxides such as dimethyl sulfoxide; and mixed solvents of two or more of these solvents.

Among these, preferable are aromatic hydrocarbons, halogenides, esters, ethers, ketones, alcohols, and amides, and particularly preferable are benzene, toluene, xylene, orthodichlorobenzene, ethyl acetate, butyl acetate, propylene glycol monomethyl ether acetate, propylene glycol monomethyl ether, tetrahydrofuran, 1,4-dioxane, methyl ethyl ketone, methyl isobutyl ketone, methanol, ethanol, n-propanol, isopropanol, n-butanol, isobutanol, tert-butanol, N,N-dimethylformamide, N,N-dimethylacetamide, and N-methyl-2-pyrrolidone.

When the polymerization reaction is performed in the presence of an organic solvent, the mass of the organic solvent with respect to the monomer A is generally 5 to 120 parts by mass and preferably 10 to 110 parts by mass.

The polymerization reaction is performed at a normal pressure, in a pressurized sealed condition, or under a reduced pressure and is preferably performed at a normal pressure because of simplicity of apparatus and operation. It is also preferable to perform the reaction in an inert gas atmosphere such as $N_2$.

The polymerization temperature may be any temperature below the boiling point of a reaction mixture. In view of polymerization efficiency and molecular weight control, the polymerization temperature is preferably 50° C. to 200° C., more preferably 80° C. to 150° C., and further preferably 80° C. to 130° C.

The reaction time cannot be determined unconditionally, because it varies by the reaction temperature, the types and ratios of the monomer A, the monomer B, the monomer C, and the polymerization initiator D, the type of the polymerization solvent, or the like. The reaction time is preferably 30 to 720 minutes and more preferably 40 to 540 minutes.

After the polymerization reaction, the obtained fluorine-containing highly branched polymer is recovered by a certain method and is subjected to a posttreatment such as washing as needed. Examples of the method for recovering the polymer from the reaction solution include reprecipitation.

The weight average molecular weight (Mw) of the thus obtained reactive fluorine-containing highly branched polymer according to the present invention measured by gel permeation chromatography in terms of polystyrene is 1,000 to 400,000 and preferably 2,000 to 200,000.

<Varnish and Thin Film>

A specific method for forming a thin film formed of the reactive fluorine-containing highly branched polymer according to the present invention includes dissolving or dispersing the reactive fluorine-containing highly branched polymer in a solvent to form varnish (a film forming material), applying the varnish onto a substrate by cast coating, spin coating, blade coating, dip coating, roll coating, bar coating, die coating, ink jetting, printing (letterpress, intaglio, planographic, screen printing, or the like), spray coating, curtain coating, or the like, and then drying the varnish on a hot plate or in an oven to form a film. The varnish containing the reactive fluorine-containing highly branched polymer is also an object of the present invention.

Among these application methods, spin coating is preferable. Spin coating has such advantages that it allows for application of a solution in a short time and thus can be used even for a solution having high volatility, and also allows for highly uniform application.

The solvent used in the form of the varnish may be any solvent that dissolves the reactive fluorine-containing highly branched polymer. Examples of the solvent include aromatic hydrocarbons such as toluene; esters or ester ethers such as ethyl acetate, butyl acetate, ethyl lactate, γ-butyrolactone, and propylene glycol monomethyl ether acetate (PGMEA); ethers such as tetrahydrofuran (THF), butylcellosolve, diethylene glycol monoethyl ether, propylene glycol monomethyl ether (PGME), propylene glycol monoethyl ether, and hexafluoropropyl hexafluoro-2-pentyl ether; ketones such as acetone, ethyl methyl ketone (MEK), isobutyl methyl ketone (MIBK), and cyclohexanone; alcohols such as methanol and ethanol; and amides such as N,N-dimethylformamide (DMF). One of these solvents may be used alone, or two or more of them may be mixed.

The concentration of the polymer dissolved or dispersed in the solvent may be any concentration. The concentration of the reactive fluorine-containing highly branched polymer with respect to the gross mass (total mass) of the reactive fluorine-containing highly branched polymer and the solvent is 0.001% to 90% by mass, preferably 0.002% to 80% by mass, and more preferably 0.005% to 70% by mass.

The thickness of the formed thin film formed of the reactive fluorine-containing highly branched polymer is generally, but not particularly limited to, 0.01 to 50 μm and preferably 0.05 to 20 μm.

<Curable Composition>

The present invention also relates to a curable composition containing (a) the reactive fluorine-containing highly branched polymer, (b) the curing agent, and (c) the polyol compound.

<(b) Curing Agent>

Examples of the curing agent used in the curable composition according to the present invention include (b1) a multifunctional isocyanate compound and (b2) an amino compound.

[(b1) Multifunctional Isocyanate Compound]

Examples of the multifunctional isocyanate compound used in the curable composition according to the present invention include ethylene diisocyanate, tetramethylene diisocyanate, hexamethylene diisocyanate (HDI), diphenylmethane diisocyanate (MDI), tolylene diisocyanate (TDI), dodecamethylene diisocyanate, 1,6,11-undecane triisocyanate, 2,2,4-trimethylhexamethylene diisocyanate, lysine diisocyanate(methyl 2,6-diisocyanatocaproate), bis(2-isocyanatoethyl) fumarate, bis(2-isocyanatoethyl) carbonate, 2-isocyanatoethyl 2,6-diisocyanatohexanoate, isophorone diisocyanate (IPDI), dicyclohexylmethane 4,4'-diisocyanate (hydrogenated MDI), cyclohexylene diisocyanate, methylcyclohexylene diisocyanate, bis(2-isocyanatoethyl) 4-cyclohexene-1,2-dicarboxylate, 2,5- and/or 2,6-norbornane diisocyanate, m- and/or p-xylylene diisocyanate, and α,α,α',α'-tetramethylxylylene diisocyanate. Examples of modified products of these include modified products of polyisocyanate such as modified MDI (urethane-modified MDI, carbodiimide-modified MDI, trihydrocarbylphosphate-modified MDI), urethane-modified TDI, biuret-modified HDI, isocyanurate-modified HDI, and isocyanurate-modified IPDI.

One of the multifunctional isocyanate compounds may be used alone, or two or more of them may be used mixedly.

[(b2) Amino Compound]

Examples of the amino compound used in the curable composition according to the present invention include melamine-based compounds, substituted urea-based compounds, and their polymers. One of the compounds may be used alone, or two or more of them may be used mixedly. The compound is preferably a curing agent having at least two cross-linking functional groups. Specific examples of the compound include CYMEL (registered trademark) series manufactured by CYTEC, NIKALAC (registered trademark) series manufactured by Sanwa Chemical Co., Ltd., methoxymethylated glycoluril, butoxymethylated glycoluril, methylolated glycoluril, methoxymethylated melamine, butoxymethylated melamine, methylolated melamine, methoxymethylated benzoguanamine, butoxymethylated benzoguanamine, methylolated benzoguanamine, methoxymethylated urea, butoxymethylated urea, methylolated urea, methoxymethylated thiourea, butoxymethylated thiourea, methylolated thiourea, and condensation products of these compounds.

[(c) Polyol Compound]

Examples of the polyol compound used in the curable composition according to the present invention include linear-chain diols such as ethylene glycol, diethylene glycol, 1,3-propanediol, 1,4-butanediol, 1,5-pentanediol, 1,6-hexanediol, 1,7-heptanediol, 1,8-octanediol, 1,9-nonanediol, and 1,10-decanediol; branched diols such as propylene glycol, neopentyl glycol, 3-methyl-1,5-pentanediol, 2,2-diethyl-1,3-propanediol, and 1,2-, 1,3- or 2,3-butanediol; diols having a cyclic group such as cyclopentane-1,2-diol, cyclohexane-1,2-diol, cyclohexane-1,4-diol, 1,4-bis(hydroxymethyl)cyclohexane, and m- or p-xylylene glycol; divalent phenols such as bisphenol A; multivalent alcohols such as glycerin, multivalent glycerin, trimethylolpropane, pentaerythritol, and dipentaerythritol; sugars such as sucrose, methyl glucoside, and sorbitol and derivatives thereof; and polymeric polyols such as polyester polyols, polyether polyols, polycarbonate polyols, and polycaprolactone polyols.

One of the polyol compounds may be used alone, or two or more of them may be used mixedly.

In the curable composition according to the present invention, the content of (a) the reactive fluorine-containing highly branched polymer is 0.01 to 20 parts by mass and more preferably 0.05 to 10 parts by mass with respect to 100 parts by mass of the total mass of (b) the curing agent, and (c) the polyol compound.

The content of (c) the polyol compound is an amount that gives 0.01 to 10 mole equivalent of the hydroxy group of (c) the polyol compound with respect to the number of moles of the cross-linking functional group (e.g., an isocyanate group) of (b) the curing agent, preferably 0.1 to 5 mole equivalent, and more preferably 0.4 to 2 mole equivalent.

[(d) Reactive Silicone Compound]

The curable composition according to the present invention may further contain (d) a reactive silicone compound.

The reactive silicone compound preferably contains a repeating unit of —(O—Si(CH$_3$)$_2$)—, and examples of the compound containing the repeating unit include the following ones.

Both-terminal alcohol-modified: SILAPLANE (registered trademark) FM-4411, FM-4421, and FM-4425 [all of which are manufactured by JNC Corporation], Shin-Etsu Silicone (registered trademark) X-22-160AS, KF-6001, KF-6002, and KF-6003 [all of which are manufactured by Shin-Etsu Chemical Co., Ltd.];

Mono-terminal alcohol-modified: SILAPLANE (registered trademark) FM-0411, FM-0421, FM-0425, FM-DA11, FM-DA21, and FA-DA26 [all of which are manufactured by JNC Corporation], Shin-Etsu Silicone (registered trademark) X-22-170BX, X-22-170DX, X-22-176DX, and X-22-176F [all of which are manufactured by Shin-Etsu Chemical Co., Ltd.];

Both-terminal ether-modified: Shin-Etsu Silicone (registered trademark) X-22-4952, X-22-4272, and X-22-6266 [all of which are manufactured by Shin-Etsu Chemical Co., Ltd.];

Both-terminal polyether-modified: BYK (registered trademark)-300, 301, 302, 306, 307, 310, 320, 325, 330, 331, 333, 337, 341, 344, 378, and UV3510 [all of which are manufactured by BYK Japan KK];

Hydroxy group-containing both-terminal polyether-modified: BYK-370 and 377 [both of which are manufactured by BYK Japan KK];

Hydroxy group-containing polyether-modified: BYK (registered trademark)-SILCLEAN (registered trademark) 3720 [manufactured by BYK Japan KK];

Hydroxy group-containing both-terminal polyether ester-modified: BYK (registered trademark)-375 [manufactured by BYK Japan KK];

Both-terminal polyester-modified: BYK (registered trademark)-310, 315, 313 [all of which are manufactured by BYK Japan KK];

Hydroxy group-containing both-terminal polyester-modified: BYK (registered trademark)-370 [manufactured by BYK Japan KK];

Both-terminal (meth)acrylic-modified: BYK (registered trademark)-UV3500, 3570 [both of which are manufactured by BYK Japan KK], SILAPLANE (registered trademark) FM-7711, FM-7721, and FM-7725 [all of which are manufactured by JNC Corporation], Shin-Etsu Silicone (registered trademark) X-22-164, X-22-164AS, X-22-164A, X-22-164-B, X-22-164C, X-22-164D, and X-22-164E [all of which are manufactured by Shin-Etsu Chemical Co., Ltd.];

Mono-terminal (meth)acrylic-modified: SILAPLANE (registered trademark) FM-0711, FM-0721, FM-0725, TM-0701, and TM-0701T [all of which are manufactured by JNC Corporation], Shin-Etsu Silicone (registered trademark) X-22-174DX, X-22-2426, and X-22-2475 [all of which are manufactured by Shin-Etsu Chemical Co., Ltd.];

Both-terminal carboxyl-modified: Shin-Etsu Silicone (registered trademark) X-22-162C [manufactured by Shin-Etsu Chemical Co., Ltd.];

Mono-terminal carboxyl-modified: Shin-Etsu Silicone (registered trademark) X-22-3710 [manufactured by Shin-Etsu Chemical Co., Ltd.], and Hydroxy group-containing silicone-modified (meth)acrylic: BYK (registered trademark)-SILCLEAN (registered trademark) 3700 [manufactured by BYK Japan KK]. Among these, preferable are both-terminal alcohol-modified, mono-terminal alcohol-modified, hydroxy group-containing both-terminal polyether-modified, hydroxy group-containing polyether-modified, hydroxy group-containing both-terminal polyether ester-modified, hydroxy group-containing both-terminal polyester-modified, both-terminal carboxyl-modified, and mono-terminal carboxyl-modified compounds having a hydroxy group or a carboxy group. Particularly preferable are mono-terminal alcohol-modified and hydroxy group-containing silicone-modified (meth)acrylic compounds.

[(e) Solvent]

The curable composition according to the present invention may further contain a solvent to be formed as varnish.

The solvent may be any solvent that dissolves the (a) to (c) components. Examples of the solvent include aromatic hydrocarbons such as toluene and xylene; esters or ester ethers such as ethyl acetate, butyl acetate, γ-butyrolactone, methyl pyruvate, ethyl pyruvate, ethyl hydroxyacetate, ethyl lactate, butyl lactate, ethyl 2-hydroxy-2-methylpropionate, methyl 2-hydroxy-3-methylbutanoate, ethyl ethoxyacetate, methyl 3-methoxypropionate, ethyl 3-methoxypropionate, methyl 3-ethoxypropionate, ethyl 3-ethoxypropionate, methylcellosolve acetate, ethylcellosolve acetate, propylene glycol monomethyl ether acetate, and propylene glycol monopropyl ether acetate; ethers such as ethylene glycol monomethyl ether, ethylene glycol monoethyl ether, diethylene glycol monomethyl ether, diethylene glycol monoethyl ether, and propylene glycol monomethyl ether; ketones such ethyl methyl ketone, isobutyl methyl ketone, cyclopentanone, and cyclohexanone; alcohols such as propylene glycol; and amides such as N,N-dimethylformamide, N,N-dimethylacetamide, and N-methyl-2-pyrrolidone. One of these solvents may be used alone, or two or more of them may be used mixedly.

A solid content in the curable composition according to the present invention is, for example, 0.5% to 80% by mass, 1% to 60% by mass, or 1% to 50% by mass. The solid content refers to a part that remains after a solvent component is removed from all the components of the curable composition.

[Other Additives]

The curable composition according to the present invention may appropriately contain additives that are generally added as needed so long as they do not impair the effects of the present invention. Examples of the additives include curing catalysts, curing accelerating agents, hydrolysis inhibitors, leveling agents, surfactants, adhesion imparting agents, plasticizers, ultraviolet absorbers, antioxidants, photostabilizers, thermal stabilizers, storage stabilizers, antistatic agents, lubricants, flame retardants, inorganic fillers, pigments, and dyes.

<Cured Film and Surface-Modified Film>

A cured film is obtained by, for example, applying the curable composition according to the present invention onto a part or the whole of a substrate surface to form a coated film, drying the coated film to remove a solvent, and giving an increased temperature to the coated film to cure the coated film. The thus obtained curd film, that is, surface-modified film is also an object of the present invention.

Examples of the substrate include plastics (polycarbonate, polymethacrylate, polystyrene, polyesters, unsaturated polyesters, polyolefins, polyamides, polyimides, polyamide-imides, epoxy, melamine, triacetylcellulose, acrylonitrile-butadiene-styrene copolymers (ABS), acrylonitrile-styrene copolymers (AS), norbornene-based resins, or the like), fiber-reinforced plastics (FRP), metal, wood, paper, glass, and slate. These substrates may be in a plate shape, a film shape, or three-dimensional molded shape.

The method for applying the curable composition according to the present invention can be appropriately selected from cast coating, spin coating, blade coating, dip coating, roll coating, bar coating, die coating, ink jetting, printing (letterpress, intaglio, planographic, screen printing, or the like), spray coating, curtain coating, or the like. Among these, spin coating is desirable to be used because of such advantages that it allows for application of a solution in a short time and thus can be used even for a highly volatile solution, and also allows for highly uniform application. The curable composition in the form of the varnish described above is suitably used. It is preferable that the curable composition is filtered using a filter whose pore size is about 0.2 μm in advance and is then applied.

After being applied onto the substrate surface, the curable composition is then preferably dried preliminarily (pre-baked) on a hot plate or in an oven to remove the solvent. The coated film is then subjected to heating treatment to form a cured film (surface-modified film).

As the conditions of the heating treatment, a heating temperature and a heating time appropriately selected from temperatures of 40° C. to 300° C. and times of 0.3 to 300 minutes are adopted.

The thickness of the obtained cured film (surface-modified film) is, after the drying and curing, preferably 0.01 to 100 μm and more preferably 0.05 to 50 μm.

EXAMPLES

The present invention will be described more specifically below with reference to examples. The present invention is not limited to the following examples. The apparatuses and conditions used in sample preparation and property analysis are as follows.

(1) $^{13}$C NMR Spectrum

Apparatus: JNM-ECA700 manufactured by JEOL Ltd.

Solvent: $CDCl_3$

Internal standard: $CDCl_3$ (77.0 ppm)

(2) Gel Permeation Chromatography (GPC)

Apparatus: HLC-8220GPC manufactured by Tosoh Corporation

Column: Shodex (registered trademark) GPC K-804L+ GPC K-805L manufactured by Showa Denko K.K.

Column temperature: 40° C.

Solvent: Tetrahydrofuran

Detector: RI (3) F Quantitative Analysis (Ion Chromatography)

Apparatus: ICS-1500 manufactured by Japan Dionex Co., Ltd.

Solvent: (2.7 mmol/L of sodium carbonate and 0.3 mmol/L of sodium bicarbonate) aqueous solution Detector: Electric conductivity (4) Glass Transition Temperature (Tg) Measurement Apparatus: DSC204F1Phoenix manufactured by NETZSCH Measurement condition: In a nitrogen atmosphere Temperature rise rate: 5° C./minute (25° C. to 200° C.)

(5) 5% Weight Loss Temperature ($Td_{5\%}$) Measurement

Apparatus: Differential heat/thermogravimetry simultaneous measuring apparatus TG-DTA2000SA manufactured by Bruker AXS K.K.

Measurement condition: In an air atmosphere
Temperature rise rate: 10° C./minute (25° C. to 400° C.)
(6) Spin Coater
  Apparatus: MS-A 100 manufactured by Mikasa Co., Ltd.
(7) Hot Plate
  Apparatus: MH-180CS+MH-3CS manufactured by AS ONE Corporation
(8) Contact Angle Measurement
  VCA Optima manufactured by AST Products, Inc.
  Measurement temperature: 25° C.
(9) Film Thickness Measurement
  Apparatus: Micro shape measuring instrument ET4000A manufactured by Kosaka Laboratory Ltd.
(10) Whole Light Transmittance and HAZE Measurement
  Apparatus: Haze meter NDH5000 manufactured by Nippon Denshoku Industries Co., Ltd.
(11) Blade Coater
  Apparatus: PM-9050MC manufactured by SMT Corporation
    Doctor blade: Gap size 76 um
    Application rate: 3 m/minute
(12) Oven
  Apparatus: Bench muffle furnace KDF-S80 manufactured by Denken Co., Ltd.
(13) Dynamic Friction Coefficient Measurement
  Apparatus: Variable load friction and abrasion tester TRIBOGEAR HHS2000 manufactured by Shinto Scientific Co., Ltd.
    Load condition: 50 g
    Probe: 0.6 mmR sapphire pin
    Measurement rate: 1 mm/sec
The abbreviations represent the following meanings:
EGDMA: Ethylene glycol dimethacrylate [1G manufactured by Shin Nakamura Chemical Co., Ltd.]
DVB: Divinylbenzene [DVB-960 manufactured by Nippon Steel & Sumikin Chemical Co., Ltd.]
C6FA: 2-(Perfluorohexyl)ethyl acrylate [R-1620 manufactured by Daikin Chemical Sales Ltd.]
4HBA: 4-Hydroxybutyl acrylate [4HBA manufactured by Nippon Kasei Chemical Co., Ltd.]
MAIB: Dimethyl 2,2′-azobisisobutyrate [MAIB manufactured by Otsuka Chemical Co., Ltd.]
AMBN: 2,2′-Azobis(2-methylbutyronitrile) [V-59 manufactured by Wako Pure Chemical Industries, Ltd.]
Silicone 1: Hydroxy group-containing silicone [BYK (registered trademark)-SILCLEAN (registered trademark) 3700 manufactured by BYK Japan KK]
Silicone 2: Mono-terminal alcohol-modified silicone [SILAPLANE (registered trademark) FM-0421 manufactured by JNC Corporation]
MIBK: Isobutyl methyl ketone
THF: Tetrahydrofuran
MEK: Ethyl methyl ketone
DMF: N,N-dimethylformamide
MeOH: Methanol Example 1

Synthesis of a Highly Branched Polymer 1 Having a 4-hydroxybutyl Group

A 200 mL reaction flask was charged with 63 g of MIBK, and nitrogen was fed thereinto for 5 minutes with stirring. The internal liquid was heated until it was refluxed (to approximately 116° C.).

Another 100 mL reaction flask was charged with 4.0 g (20 mmol) of EGDMA as the monomer A, 4.2 g (10 mmol) of C6FA as the monomer B, 1.5 g (10 mmol) of 4HBA as the monomer C, 2.4 g (10 mmol) of MAIB as the initiator D, and 63 g of MIBK. Nitrogen was then fed thereinto for 5 minutes with stirring to replace the atmosphere with nitrogen.

To MIBK being refluxed in the 200 mL reaction flask, the content of the 100 mL reaction flask charged with EGDMA, C6FA, 4HBA, and MAIB was added dropwise using a dropping pump over 30 minutes. After completion of the dropwise addition, the reaction mixture was stirred for additional 1 hour.

After 95 g of MIBK was distilled off from the reaction mixture using a rotary evaporator, the residue was added to 198 g of hexane to precipitate a polymer in the form of slurry. This slurry was filtered under a reduced pressure and was vacuum dried to obtain 6.9 g of a target compound (a highly branched polymer 1) as white powder.

FIG. 1 illustrates a $^{13}$C NMR spectrum of the obtained highly branched polymer 1. The composition (molar ratio) of the unit structures represented by the following structural formulae of the highly branched polymer 1 which was calculated from the NMR spectrum, was EGDMA unit [A-1]:C6FA unit [B]:4HBA unit [C]:MAIB unit [D-1]=1.5: 0.5:0.6:0.6. The weight average molecular weight Mw of the polymer by GPC in terms of polystyrene was 6,700, and the degree of distribution (Mw (weight average molecular weight)/Mn (number average molecular weight)) thereof was 1.6.

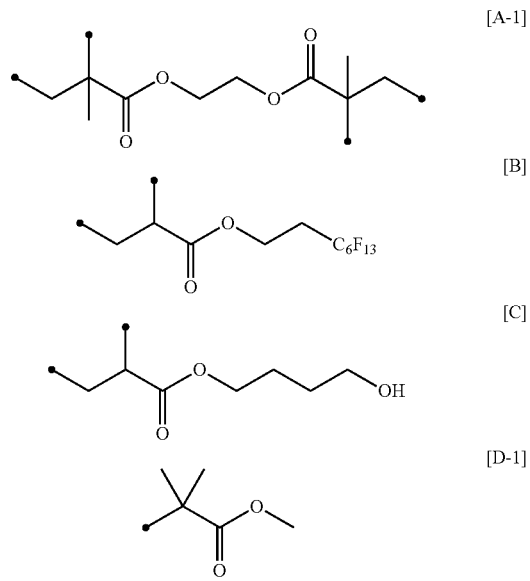

where a black dot indicates a connection terminal.

Example 2

Synthesis of a Highly Branched Polymer 2 Having a 4-hydroxybutyl Group

A 200 mL reaction flask was charged with 63 g of MIBK, and nitrogen was fed thereinto for 5 minutes with stirring. The internal liquid was heated until it was refluxed (to approximately 116° C.).

Another 100 mL reaction flask was charged with 4.0 g (20 mmol) of EGDMA as the monomer A, 4.3 g (10 mmol) of C6FA as the monomer B, 1.5 g (10 mmol) of 4HBA as the monomer C, 2.4 g (10 mmol) of AMBN as the initiator D, and 63 g of MIBK. Nitrogen was then fed thereinto for 5 minutes with stirring to replace the atmosphere with nitrogen.

To MIBK being refluxed in the 200 mL reaction flask, the content of the 100 mL reaction flask charged with EGDMA, C6FA, 4HBA, and AMBN was added dropwise using a dropping pump over 30 minutes. After completion of the dropwise addition, the reaction mixture was stirred for additional 1 hour.

After 95 g of MIBK was distilled off from the reaction mixture using a rotary evaporator, the residue was added to 198 g of hexane to precipitate a polymer in the form of slurry. This slurry was filtered under a reduced pressure and was vacuum dried to obtain 4.3 g of a target compound (a highly branched polymer 2) as white powder.

Figure 2:
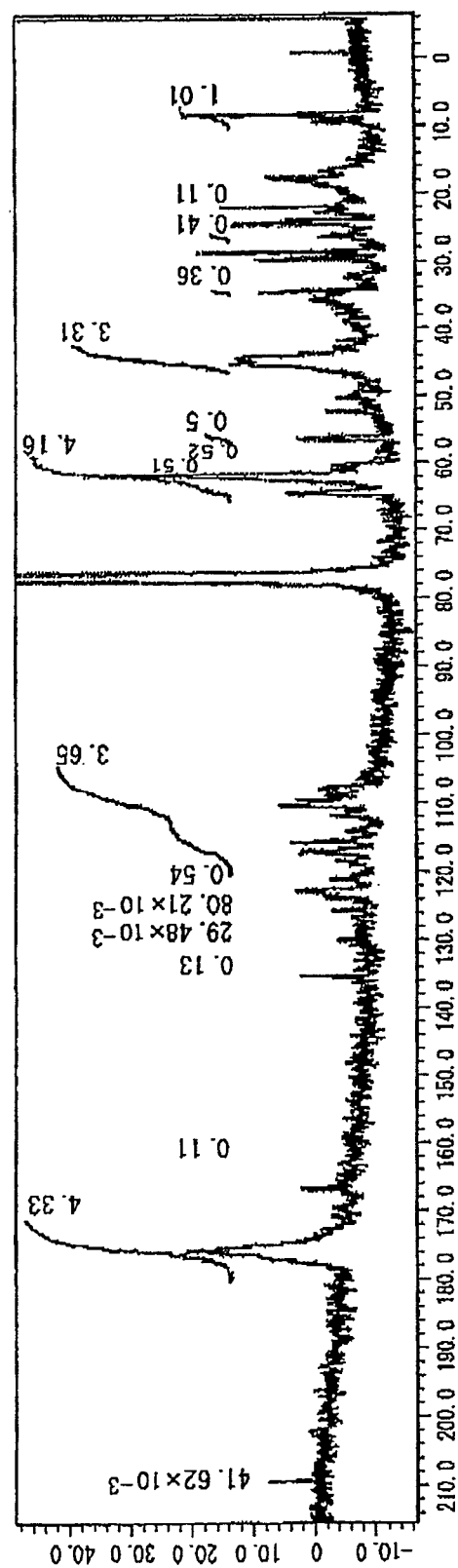
FIG. 2 is a graph illustrating a $^{13}$C NMR spectrum of a highly branched polymer 2 obtained in Example 2.

FIG. 2 illustrates a $^{13}$C NMR spectrum of the obtained highly branched polymer 2. The composition (molar ratio) of the unit structures represented by the following structural formulae of the highly branched polymer 2 represented by structural formulae below, which was calculated from the NMR spectrum, was EGDMA unit [A-1]:C6FA unit [B]:4HBA unit [C]:AMBN unit [D-2]-1.6:0.5:0.5:0.5. The weight average molecular weight Mw of the polymer by GPC in terms of polystyrene was 6,600, and the degree of distribution (Mw/Mn) thereof was 1.9.

To MIBK being refluxed in the 200 mL reaction flask, the content of the 100 mL reaction flask charged with DVB, C6FA, 4HBA, and AMBN was added dropwise using a dropping pump over 30 minutes. After completion of the dropwise addition, the reaction mixture was stirred for additional 1 hour.

After 62 g of MIBK was distilled off from the reaction mixture using a rotary evaporator, the residue was added to 130 g of hexane to precipitate a polymer in the form of slurry. This slurry was filtered under a reduced pressure and was vacuum dried to obtain 5.4 g of a target compound (a highly branched polymer 3) as white powder.

Figure 3:
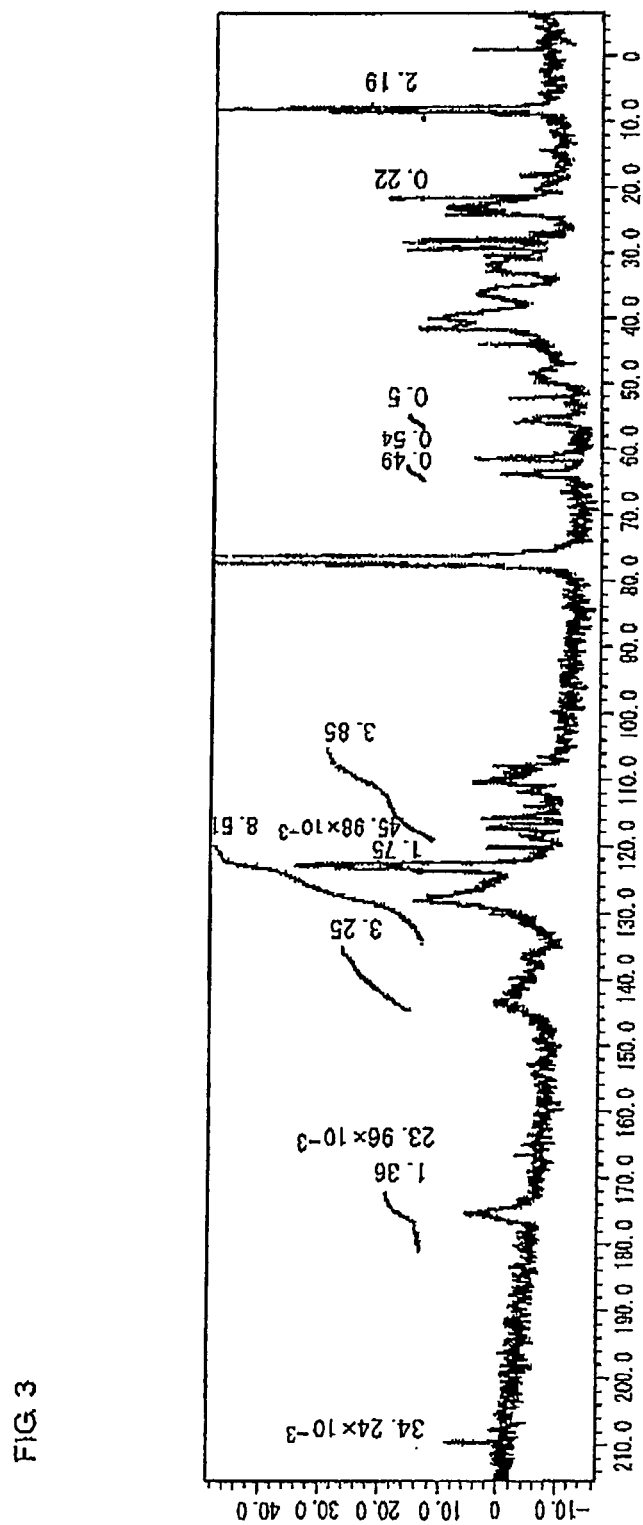
FIG. 3 is a graph illustrating a $^{13}$C NMR spectrum of a highly branched polymer 3 obtained in Example 3.

FIG. 3 illustrates a $^{13}$C NMR spectrum of the obtained highly branched polymer 3. The composition (molar ratio) of the unit structures represented by the following structural formulae of the highly branched polymer 3 represented by structural formulae below, which was calculated from the NMR spectrum, was DVB unit [A-2]:C6FA unit [B]:4HBA unit [C]:AMBN unit [D-2]=1.3:0.5:0.5:1.1. The weight average molecular weight Mw of the polymer by GPC in terms of polystyrene was 6,300, and the degree of distribution (Mw/Mn) thereof was 1.7.

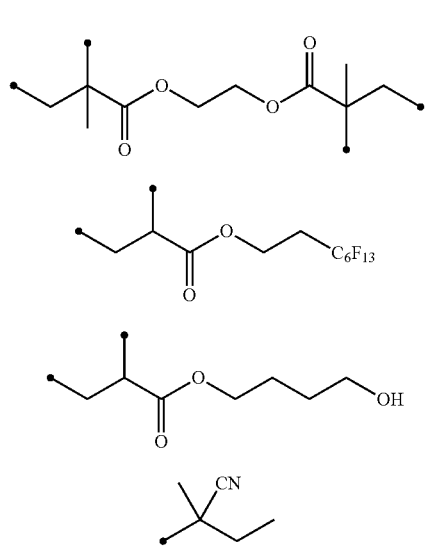

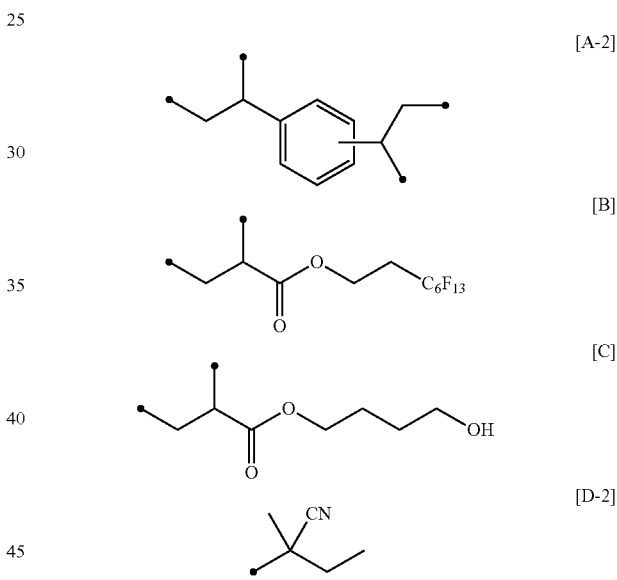

where a black dot indicates a connection terminal.

Example 3

Synthesis of a Highly Branched Polymer 3 Having a 4-hydroxybutyl Group

A 200 mL reaction flask was charged with 52 g of MIBK, and nitrogen was fed thereinto for 5 minutes with stirring. The internal liquid was heated until it was refluxed (to approximately 116° C.).

Another 100 mL reaction flask was charged with 2.6 g (20 mmol) of DVB as the monomer A, 4.3 g (10 mmol) of C6FA as the monomer B, 1.4 g (10 mmol) of 4HBA as the monomer C, 4.6 g (24 mmol) of AMBN as the initiator D, and 52 g of MIBK. Nitrogen was then fed thereinto for 5 minutes with stirring to replace the atmosphere with nitrogen.

where a black dot indicates a connection terminal.

Comparative Synthesis Example 1

Synthesis of a Highly Branched Polymer 4 Having No Hydroxy Group

A 200 mL reaction flask was charged with 32 g of toluene, and nitrogen was fed thereinto for 5 minutes with stirring. The internal liquid was heated until it was refluxed (to approximately 110° C.).

Another 100 mL reaction flask was charged with 4.0 g (20 mmol) of EGDMA as the monomer A, 4.2 g (10 mmol) of C6FA as the monomer B, 2.3 g (10 mmol) of MAIB as the initiator D, and 32 g of toluene. Nitrogen was then fed thereinto for 5 minutes with stirring to replace the atmosphere with nitrogen.

To toluene being refluxed in the 200 mL reaction flask, the content of the 100 mL reaction flask charged with EGDMA, C6FA, and MAIB was added dropwise using a dropping pump over 30 minutes. After completion of the dropwise addition, the reaction mixture was stirred for additional 1 hour.

The reaction mixture was added to 277 g of a hexane/toluene liquid mixture (mass ratio 4:1) to precipitate a polymer in the form of slurry. This slurry was filtered under a reduced pressure, and the resultant crude product was dissolved in 36 g of THF. This solution was added to 277 g of hexane to precipitate a polymer in the form of slurry. This slurry was filtered under a reduced pressure and was vacuum dried to obtain 4.9 g of a target compound (a highly branched polymer 4) as white powder.

Figure 4:
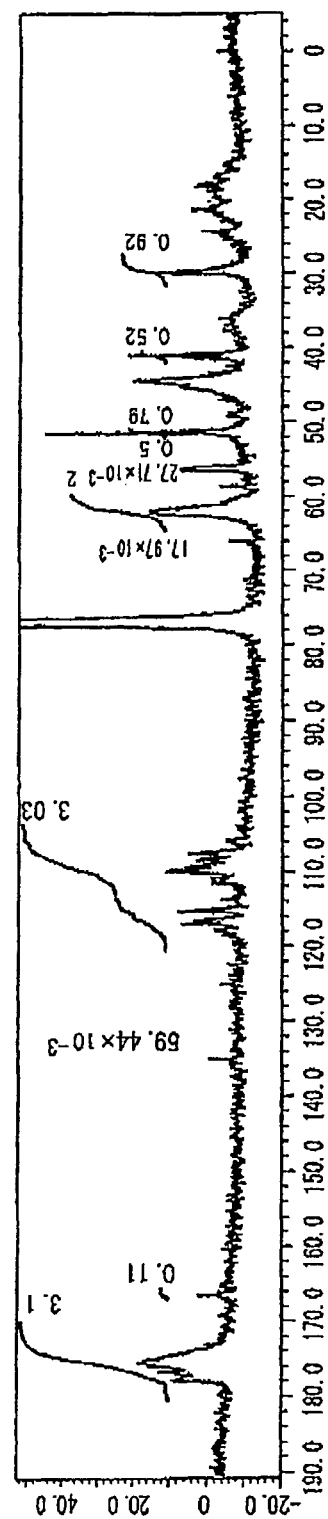
FIG. 4 is a graph illustrating a $^{13}$C NMR spectrum of a highly branched polymer 4 obtained in a Comparative Synthesis Example.

FIG. 4 illustrates a $^{13}$C NMR spectrum of the obtained highly branched polymer 4. The composition (molar ratio) of the unit structures represented by the following structural formulae of the highly branched polymer 4 represented by structural formulae below, which was calculated from the NMR spectrum, was EGDMA unit [A-1]:C6FA unit [B]:MAIB unit [D-1]=1.0:0.5:0.4. The weight average molecular weight Mw of the target compound by GPC in terms of polystyrene was 16,000, and the degree of distribution (Mw/Mn) thereof was 2.4.

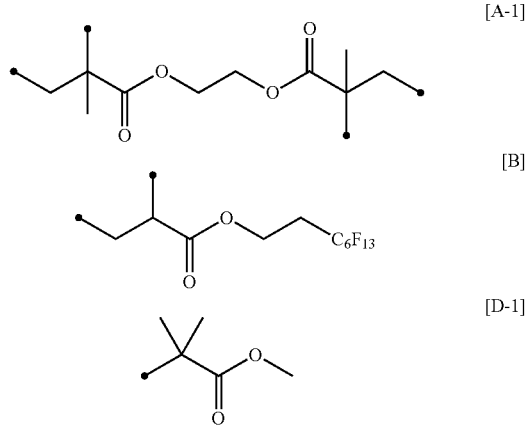

where a black dot indicates a connection terminal.

Table 1 lists the weight average molecular weight, the degree of distribution, the incorporated amount of the monomer B determined from the $^{13}$C NMR spectrum, the F atom content determined from the F quantitative analysis, the glass transition temperature (Tg), and the 5% weight loss temperature (Td$_{5\%}$) of the highly branched polymers 1 to 3 obtained in Examples 1 to 3 and the highly branched polymer 4 obtained in Comparative Synthesis Example 1.

TABLE 1

|  | Mw | Mw/Mn | Incorporated amount of monomer B [% by mass] | F atom content [% by mass] | Tg [° C.] | Td$_{5\%}$ [° C.] |
|---|---|---|---|---|---|---|
| Highly branched polymer 1 | 6,700 | 1.6 | 29 | 20 | 48.7 | 276.2 |
| Highly branched polymer 2 | 6,600 | 1.9 | 31 | 20 | 54.4 | 284.7 |
| Highly branched polymer 3 | 6,300 | 1.7 | 33 | 21 | 52.0 | 309.3 |
| Highly branched polymer 4 | 16,000 | 2.4 | 43 | 25 | 79.6 | 272.1 |

Example 4

Solvent Solubility of the Highly Branched Polymers 1 to 3

As for the highly branched polymers obtained in Examples 1 to 3, solubility against solvents listed in Table 2 was evaluated. The highly branched polymers were mixed with the respective solvents so as to have a concentration of 10% by mass. After the mixture was stirred at 25° C. for 1 minute, the solubility was visually evaluated in accordance with the following standard. The results are listed in Table 2 together.

[Evaluation Standard]

◯: The polymer is perfectly dissolved to be a transparent solution.

x: The polymer remains fully or partially undissolved.

TABLE 2

|  | Toluene | Acetone | MEK | THF | DMF | MeOH |
|---|---|---|---|---|---|---|
| Highly branched polymer 1 | ◯ | ◯ | ◯ | ◯ | ◯ | x |
| Highly branched polymer 2 | x | ◯ | ◯ | ◯ | ◯ | x |
| Highly branched polymer 3 | ◯ | ◯ | ◯ | ◯ | ◯ | ◯ |

Examples 5 to 16

Surface Modification of a Polyurethane Resin

Mixed were 15.4 parts by mass of a polyisocyanate [CORONATE (registered trademark) HXLV (content of isocyanate group: 23.4% by mass) manufactured by Nippon Polyurethane Industry Co., Ltd.] and 85.6 parts by mass of a polyol [DURANOL (trademark) T5652 (hydroxyl value: 56.8 mgKOH/g) manufactured by Asahi Kasei Chemicals Corporation] as polyurethane raw materials, the highly branched polymers 1 to 3 in respective amounts listed in Table 3 as additives, and 400 parts by mass of MEK. This mixture was sufficiently stirred and was filtered by a filter to prepare a uniform curable composition.

This curable composition was applied onto a 5 cm by 5 cm glass substrate by spin coating (5 seconds of slope, 1,500 rpm×30 seconds, and then 5 seconds of slope) to form a film. The coated film was dried on a hot plate at 70° C. for 10 minutes and was then heated on hot plate a 150° C. for 20 minutes to prepare a cured film.

The contact angles of water, hexadecane, and oleic acid of the obtained cured film were measured. The results are listed in Table 3 together.

Comparative Example 1

Polyurethane Resin Cured Film

Operation and evaluation were performed in the same manner as Example 5 except that no additive was used. The results are listed in Table 3 together.

TABLE 3

| | Additive | Addition amount [parts by mass] | Contact angle [degree] | | |
|---|---|---|---|---|---|
| | | | Water | Hexadecane | Oleic acid |
| Example 5 | Highly branched polymer 1 | 1.0 | 100 | 61 | 66 |
| Example 6 | Highly branched polymer 1 | 0.5 | 102 | 60 | 67 |
| Example 7 | Highly branched polymer 1 | 0.25 | 99 | 57 | 64 |
| Example 8 | Highly branched polymer 1 | 0.1 | 87 | 34 | 57 |
| Example 9 | Highly branched polymer 2 | 1.0 | 100 | 60 | 64 |
| Example 10 | Highly branched polymer 2 | 0.5 | 98 | 58 | 66 |
| Example 11 | Highly branched polymer 2 | 0.25 | 100 | 55 | 64 |
| Example 12 | Highly branched polymer 2 | 0.1 | 87 | 41 | 57 |
| Example 13 | Highly branched polymer 3 | 1.0 | 101 | 60 | 66 |
| Example 14 | Highly branched polymer 3 | 0.5 | 103 | 57 | 61 |
| Example 15 | Highly branched polymer 3 | 0.25 | 99 | 57 | 61 |
| Example 16 | Highly branched polymer 3 | 0.1 | 83 | 43 | 58 |
| Comparative Example 1 | Absent | — | 66 | 7 | 13 |

Examples 17 to 19

Durability of the Surface Modification Effect by the Highly Branched Polymers Having a Hydroxy Group Each of the cured films prepared in Examples 5, 9, and 13 was immersed into 25° C. MEK for 30 seconds and was then dried using an air gun. The film thickness of the cured film before and after the immersion into MEK was measured, and the degree of cure (=(1−(film thickness before immersion−film thickness after immersion)/film thickness before immersion)×100) was determined. In addition, the contact angles of water, hexadecane, and oleic acid on the cured film before and after the immersion into MEK were measured to evaluate changes in the surface modification effect. The results are listed in Table 4 together. The HAZE values of the cured films before the immersion into MEK are listed in Table 4 together.

Comparative Example 2

Durability of the Surface Modification Effect by the Highly Branched Polymer Having No Hydroxy Group A cured film was obtained through operation performed in the same manner as Example 5 except that the highly branched polymer 4 was used as an additive. Operation and evaluation were performed in the same manner as Example 17 for this cured film. The results are listed in Table 4 together.

Comparative Example 3

Durability of Polyurethane Resin Cured Film

Operation and evaluation were performed in the same manner as Example 17 for the cured film prepared in Comparative Example 1. The results are listed in Table 4 together.

TABLE 4

| | | | Film thickness [μm] | | Degree of cure [%] | Contact angle [degree] | | | | | |
|---|---|---|---|---|---|---|---|---|---|---|---|
| | | | | | | Water | | Hexadecane | | Oleic acid | |
| | Additive | HAZE | Before immersion | After immersion | | Before immersion | After immersion | Before immersion | After immersion | Before immersion | After immersion |
| Example 17 | Highly branched polymer 1 | 0.25 | 1.74 | 1.65 | 95 | 100 | 99 | 61 | 63 | 66 | 68 |
| Example 18 | Highly branched polymer 2 | 0.04 | 1.75 | 1.72 | 98 | 100 | 98 | 60 | 58 | 64 | 65 |
| Example 19 | Highly branched polymer 3 | 0.01 | 1.67 | 1.67 | 100 | 101 | 99 | 60 | 57 | 66 | 62 |
| Comparative Example 2 | Highly branched polymer 4 | 0.05 | 1.88 | 1.83 | 97 | 99 | 78 | 69 | 39 | 72 | 62 |
| Comparative Example 3 | Absent | 0.06 | 1.99 | 1.90 | 95 | 66 | 66 | 7 | 6 | 13 | 13 |

As listed in Table 4, surface modification by the highly branched polymers 1 to 3 having a hydroxy group (Examples 17 to 19) showed little reduction in the contact angle before and after the immersion into MEK and cured films having high durability of the surface modification effect is obtained. In contrast, surface modification by the highly branched polymer 4 having no hydroxy group (Comparative Example 2) showed remarkable reductions in the contact angles of water, hexadecane, and oleic acid through the immersion into MEK.

It has been confirmed from these results that as for the highly branched polymers having a hydroxy group, when the polyurethane raw materials are cured, the highly branched polymers are firmly bound to the polyurethane resin.

Examples 20 to 22 and Comparative Example 4

Surface Modification of a Polyester Resin

[Preparation of Cured Films]

Mixed were 100 parts by mass of a polyester resin [VYLON (registered trademark) GK150 manufactured by Toyobo Co., Ltd.], 20 parts by mass of a melamine compound [CYMEL (registered trademark) 303 manufactured by CYTEC] as a curing agent, 1 part by mass of p-toluenesulfonic acid as a curing catalyst, the highly branched polymer 1 obtained in Example 1 in each amount listed in Table 5, reactive silicones listed in Table 5 in respective amounts listed in Table 5, and 238 parts by mass of cyclohexanone. This mixture was stirred well to prepare a uniform curable composition.

This curable composition was applied onto a 7.5 cm by 10 cm glass substrate by blade coating (coating speed 3 m/minute) using a doctor blade (gap size 76 μm) to form a coated film. This coated film was heated in an oven at 210° C. for 1 minute to form a cured film.

[Evaluation of the Cured Films]

The contact angles of water and oleic acid, HAZE, dynamic friction coefficient, slidability, and oil-marker resistance of the obtained cured films were evaluated. As for the slidability, the surface of the cured film was rubbed with a nonwoven wiper [BEMCOT (registered trademark) M-1 manufactured by Asahi Kasei Fibers Corporation], and a feel at that time was evaluated in accordance with the following standard. As for the oil-marker resistance, a line was drawn on the surface of the cured film with an oil marker pen [MAGIC INK (registered trademark) No. 700 Gokuhoso (black) manufactured by Teranishi Chemical Industry Co., Ltd.], and the drawn line was visually checked and evaluated in accordance with the following standard. The results are listed in Table 5 together.

<Evaluation Standard for Slidability>
A: Almost no resistance is felt.
B: The surface can be rubbed smoothly although it feels a little resistance.
C: The surface feels resistance and cannot be rubbed smoothly.

<Evaluation Standard for Oil-Marker Resistance>
A: The ink of the oil marker pen is rejected and dotted, and a line can hardly be drawn.
B: A line is partly faded and cannot be drawn clearly.
C: A line can be drawn.

[Durability of the Cured Films]

The cured films prepared in Examples 20 to 22 and Comparative Example 4 were immersed into 25° C. acetone for 30 seconds and were then dried using an air gun. The contact angles of water and oleic acid on the cured films before and after the immersion into acetone were measured to evaluate changes in the surface modification effect. The results are listed in Table 5 together.

TABLE 5

| | Highly branched polymer 1 Addition amount [parts by mass] | Reactive silicone Type | Reactive silicone Addition amount [parts by mass] | Contact angle [degree] Water Before immersion | Contact angle [degree] Water After immersion | Contact angle [degree] Oleic acid Before immersion | Contact angle [degree] Oleic acid After immersion | HAZE | Dynamic friction coefficient | Slidability | Oil-marker resistance |
|---|---|---|---|---|---|---|---|---|---|---|---|
| Example 20 | 1 | Absent | — | 100 | 98 | 62 | 59 | 0.61 | 0.42 | C | C |
| Example 21 | 0.9 | Silicone 1 | 0.1 | 100 | 100 | 60 | 57 | 0.37 | 0.18 | B | A |
| Example 22 | 0.75 | Silicone 1 | 0.25 | 102 | 102 | 48 | 48 | 0.62 | 0.02 | A | A |
| | | Silicone 2 | 0.05 | | | | | | | | |
| Comparative Example 4 | Absent | Absent | — | 76 | 72 | 12 | 9 | 0.49 | 0.24 | C | C |

As listed in Table 5, surface modification by the highly branched polymer 1 having a hydroxy group (Examples 20 to 22) showed little reduction in the contact angle before and after the immersion into acetone and cured films having high durability of the surface modification effect are obtained.

It has been confirmed from these results that as for the highly branched polymers having a hydroxy group, when the polyester resin is cured, the highly branched polymers are firmly bound to the polyester resin with the curing agent.

It has also been confirmed that adding the reactive silicones can impart functions such as slidability and oil-marker resistance while durability is sustained (Examples 21 and 22).

The invention claimed is:

1. A reactive fluorine-containing highly branched polymer obtained by:
   polymerizing a monomer A having in a molecule two or more radically polymerizable double bonds, a monomer B having in a molecule a fluoroalkyl group and at least one radically polymerizable double bond optionally substituted with a hydroxy group, in an amount of 5% to 300% by mole with respect to the number of moles of the monomer A, and a monomer C having in a molecule an alcoholic hydroxy group and at least one radically polymerizable double bond, in an amount of 5% to 300% by mole with respect to the number of moles of the monomer A, in a presence of a polymerization initiator D, in an amount of 5% to 200% by mole with respect to the number of moles of the monomer A.

2. The reactive fluorine-containing highly branched polymer according to claim 1, wherein
the monomer C is a compound having at least either a vinyl group or a (meth)acryl group.

3. The reactive fluorine-containing highly branched polymer according to claim 2, wherein
the monomer C is a compound of Formula:

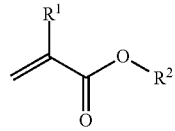

[1]

(where $R^1$ is a hydrogen atom or a methyl group; and $R^2$ is a $C_{1-30}$ aliphatic group substituted with at least one hydroxy group).

4. The reactive fluorine-containing highly branched polymer according to claim 3, wherein
$R^2$ is a $C_{1-30}$ aliphatic group in which a hydroxy group is bound to a primary carbon atom in Formula [1].

5. The reactive fluorine-containing highly branched polymer according to claim 4, wherein
the monomer C is 4-hydroxybutyl (meth)acrylate.

6. The reactive fluorine-containing highly branched polymer according to claim 1, wherein
the monomer B is a compound having at least either a vinyl group or a (meth)acryl group.

7. The reactive fluorine-containing highly branched polymer according to claim 6, wherein
the monomer B is a compound of Formula [2]:

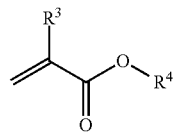

[2]

(where $R^3$ is a hydrogen atom or a methyl group; and $R^4$ is a $C_{2-12}$ fluoroalkyl group optionally substituted with a hydroxy group).

8. The reactive fluorine-containing highly branched polymer according to claim 7, wherein
the monomer B is a compound of Formula [3]:

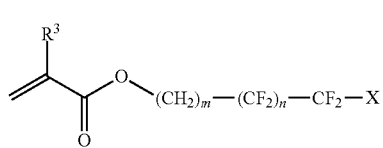

[3]

(where $R^3$ is the same meaning as the definition in Formula [2]; X is a hydrogen atom or a fluorine atom; m is 1 or 2; and n is an integer of 0 to 5).

9. The reactive fluorine-containing highly branched polymer according to claim 1, wherein
the monomer A is a compound wherein (1) at least one of the radically polymerizable double bonds is in the form of a vinyl group, (2) at least one of the radically polymerizable double bonds is in the form of a (meth)acryl group, or (3) at least two of the radically polymerizable double bonds are in the form of a vinyl group and a (meth)acryl group.

10. The reactive fluorine-containing highly branched polymer according to claim 9, wherein
the monomer A is a divinyl compound or a di(meth)acrylate compound.

11. The reactive fluorine-containing highly branched polymer according to claim 10, wherein
the monomer A is divinyl benzene or ethylene glycol di(meth)acrylate.

12. The reactive fluorine-containing highly branched polymer according to claim 1, wherein
the polymerization initiator D is an azo-based polymerization initiator.

13. The reactive fluorine-containing highly branched polymer according to claim 12, wherein
the polymerization initiator D is dimethyl 2,2'-azobisisobutyrate or 2,2'-azobis(2-methylbutyronitrile).

14. A varnish comprising:
the reactive fluorine-containing highly branched polymer as claimed in claim 1.

15. A thin film formed of the reactive fluorine-containing highly branched polymer as claimed in claim 1.

* * * * *